(12) United States Patent
Kashiwagi

(10) Patent No.: US 7,553,915 B2
(45) Date of Patent: Jun. 30, 2009

(54) SILICONE COMPOSITION AND CURED PRODUCT

(75) Inventor: Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 385 days.

(21) Appl. No.: 11/633,589

(22) Filed: Dec. 5, 2006

(65) Prior Publication Data
US 2007/0129508 A1 Jun. 7, 2007

(30) Foreign Application Priority Data
Dec. 6, 2005 (JP) ............................. 2005-352145

(51) Int. Cl.
C08L 83/04 (2006.01)
(52) U.S. Cl. ...................... 525/477; 525/478; 525/479; 528/15; 528/31; 528/32
(58) Field of Classification Search ........................ None
See application file for complete search history.

(56) References Cited

U.S. PATENT DOCUMENTS 3,840,393 A * 10/1974 Ishizaka et al. .......... 427/208.4
RE34,027 E * 8/1992 Nakamura et al. .......... 428/35.8
5,268,433 A * 12/1993 Ikeno et al. .................. 525/478
5,764,181 A * 6/1998 Fey et al. ........................ 342/4
5,942,591 A * 8/1999 Itoh et al. ....................... 528/15

FOREIGN PATENT DOCUMENTS

| EP | 568 318 A1 | * | 11/1993 |
| JP | 2004-339482 A | | 12/2004 |
| JP | 2005-76003 A | | 3/2005 |

* cited by examiner

Primary Examiner—Marc S Zimmer
(74) Attorney, Agent, or Firm—Westerman, Hattori, Daniels & Adrian, LLP.

(57) ABSTRACT

A silicone composition is provided comprising (A) an organopolysiloxane of resin structure consisting of $R^1SiO_{1.5}$, $R^2_2SiO$, and $R^3_aR^4_bSiO_{(4-a-b)/2}$ units, wherein $R^1$, $R^2$, and $R^3$ are methyl, ethyl, propyl, cyclohexyl or phenyl, $R^4$ is vinyl or allyl, a is 0, 1 or 2, b is 1 or 2, a+b is 2 or 3, the number of recurring $R^2_2SiO$ units being 10 to 300, (B) an organohydrogenpolysiloxane of resin structure consisting of $R^1SiO_{1.5}$, $R^2_2SiO$, and $R^3_cH_dSiO_{(4-c-d)/2}$ units, wherein $R^1$, $R^2$, and $R^3$ are as defined above, c is 0, 1 or 2, d is 1 or 2, c+d is 2 or 3, the number of recurring $R^2_2SiO$ units being 10 to 300, and (C) a platinum catalyst. The silicone composition cures into a product exhibiting flexibility and minimized surface tack, and can be effectively molded on the existing molding machines.

4 Claims, No Drawings

SILICONE COMPOSITION AND CURED PRODUCT

CROSS-REFERENCE TO RELATED APPLICATION

This non-provisional application claims priority under 35 U.S.C. §119(a) on Patent Application No. 2005-352145 filed in Japan on Dec. 6, 2005, the entire contents of which are hereby incorporated by reference.

TECHNICAL FIELD

This invention relates to silicone compositions of the addition cure type, and more particularly, to silicone compositions which cure into products having improved surface tack and strength characteristics, and cured products.

BACKGROUND ART

Silicone rubber compositions are used in a variety of applications because they form cured products having excellent properties such as weathering and heat resistance as well as favorable rubber properties such as hardness and elongation. Because of surface tack, a problem of dust deposition arises when silicone rubber compositions are used as coatings on electric and electronic parts.

Silicone varnishes have solved the problem, but are susceptible to cracks. For packages of electric and electronic parts and the like, a silicone composition capable of forming a cured product which avoids dust deposition on its surface and have satisfactory crack resistance and impact resistance is desired. There is also a demand for a silicone composition which is solid or semisolid at room temperature so that it can be cured on the existing molding machines.

As is known in the art, silicone rubber compositions of the addition cure type can be improved in cured strength by compounding resinous organopolysiloxane. The incorporation of resinous organopolysiloxane is effective in increasing the cured strength, but still leaves the problem of dust deposition because the surface remains tacky. Instead, hard resins are insufficient in impact resistance, suffering a serious problem of cracking in a thermal shock test.

Reference should be made to JP-A 2005-76003 and JP-A 2004-339482 corresponding to U.S. Pat. No. 7,019,100.

DISCLOSURE OF THE INVENTION

An object of the present invention is to provide a silicone composition of the addition cure type which cures into a product exhibiting improved flexibility and minimized surface tack despite hard resin, and which can be effectively molded on the existing molding machines such as transfer molding, compression molding and injection molding machines.

The inventor has found that when a silicone composition of the addition cure type is formulated by using as the alkenyl-containing organopolysiloxane (A) an organopolysiloxane of resin structure consisting of $R^1SiO_{1.5}$ units, $R^2_2SiO$ units, and $R^3_aR^4_bSiO_{(4-a-b)/2}$ units, wherein $R^1$, $R^2$, $R^3$, $R^4$, a and b are defined below, the number of recurring $R^2_2SiO$ units being 10 to 300, and using as the organohydrogenpolysiloxane (B) an organohydrogenpolysiloxane of resin structure consisting of $R^1SiO_{1.5}$ units, $R^2_2SiO$ units, and $R^3_cH_dSiO_{(4-c-d)/2}$ units, wherein $R^1$, $R^2$, $R^3$, c and d are defined below, the number of recurring $R^2_2SiO$ units being 10 to 300, the resulting silicone composition cures into a product that exhibits improved flexibility and minimized surface tack despite hard resin, and additionally, the silicon composition can be effectively molded on the existing molding machines. The present invention is predicated on this finding.

In one aspect, the invention provides a silicone composition comprising (A) an organopolysiloxane of resin structure consisting of $R^1SiO_{1.5}$ units, $R^2_2SiO$ units, and $R^3_aR^4_bSiO_{(4-a-b)/2}$ units, wherein $R^1$, $R^2$, and $R^3$ each are a methyl, ethyl, propyl, cyclohexyl or phenyl radical, $R^4$ is a vinyl or allyl radical, a is 0, 1 or 2, b is 1 or 2, the sum a+b is 2 or 3, the number of recurring $R^2_2SiO$ units being 10 to 300, (B) an organohydrogenpolysiloxane of resin structure consisting of $R^1SiO_{1.5}$ units, $R^2_2SiO$ units, and $R^3_cH_dSiO_{(4-c-d)/2}$ units, wherein $R^1$, $R^2$, and $R^3$ are as defined above, c is 0, 1 or 2, d is 1 or 2, the sum c+d is 2 or 3, the number of recurring $R^2_2SiO$ units being 10 to 300, in such an amount that a molar ratio of silicon-bonded hydrogen atoms in component (B) to vinyl or allyl radicals in component (A) is from 0.1 to 4.0, and (C) an effective amount of a platinum group catalyst.

Preferably, the silicone composition is solid at room temperature (e.g., 25° C.). Also preferably, component (A) and/or (B) contains silanol radicals.

In another aspect, the invention provides a cured product obtained by curing the silicone composition.

BENEFITS OF THE INVENTION

The addition cure type silicone composition of the invention cures into a product that exhibits improved flexibility and minimized surface tack despite hard resin. The silicon composition can be effectively molded on the existing molding machines.

DESCRIPTION OF THE PREFERRED EMBODIMENT

It is noted that Me stands for methyl, Et stands for ethyl, Vi stands for vinyl, and Ph stands for phenyl.

(A) Organopolysiloxane of Resin Structure

The organopolysiloxane of resin structure, which is a critical component of the inventive composition, consists of $R^1SiO_{1.5}$ units, $R^2_2SiO$ units, and $R^3_aR^4_bSiO_{(4-a-b)/2}$ units, wherein $R^1$, $R^2$, and $R^3$ each are a methyl, ethyl, propyl, cyclohexyl or phenyl radical, $R^4$ is a vinyl or allyl radical, a is 0, 1 or 2, b is 1 or 2, the sum a+b is 2 or 3. The number of recurring $R^2_2SiO$ units is 10 to 300, preferably 15 to 200, more preferably 20 to 100. As used herein, the term "resin structure" refers to a three-dimensional network structure. As used herein, the phrase that "the number of recurring $R^2_2SiO$ units is 10 to 300" means that at least 50 mol % (50 to 100 mol %), especially at least 80 mol % (80 to 100 mol %) of the entire $R^2_2SiO$ units included in component (A) form in the molecule a linear diorganopolysiloxane chain of the structure:

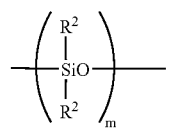

wherein m is an integer of 10 to 300.

The $R^2_2SiO$ units form a chain-like polymer, which can be modified into a branched or network polymer by incorporating $R^1SiO_{1.5}$ units therein. $R^4$ (vinyl or allyl) in the $R^3_aR^4_bSiO_{(4-a-b)/2}$ units undergoes hydrosilylating addition reaction with silicon-bonded hydrogen atoms (i.e., SiH radicals) in $R^3_cH_dSiO_{(4-c-d)/2}$ units of component (B), to be described later, thereby forming a cured product.

From the standpoint of cured properties, the $R^1SiO_{1.5}$ units, $R^2_2SiO$ units, and $R^3_aR^4_bSiO_{(4-a-b)/2}$ units of which the organopolysiloxane (A) is composed are preferably included in a molar ratio of 90-24:75-9:50-1, more preferably 70-28:70-20:10-2.

The organopolysiloxane (A) should preferably have a weight average molecular weight (Mw) of 3,000 to 1,000,000, more preferably 10,000 to 100,000, as determined by gel permeation chromatography (GPC) versus polystyrene standards. The organopolysiloxanes in this viscosity range, which are solid or semisolid, are preferred from the standpoints of working and curing properties.

The organopolysiloxane of resin structure can be synthesized by combining compounds corresponding to the respective units so as to give a molar ratio within the above-defined range, and effecting co-hydrolytic condensation in the presence of an acid, for example.

Examples of the monomers from which $R^1SiO_{1.5}$ units are derived include $MeSiCl_3$, $EtSiCl_3$, $PhSiCl_3$, propyltrichlorosilane, and cyclohexyltrichlorosilane, and alkoxysilanes (e.g., methoxysilanes) corresponding to the foregoing chlorosilanes.

Examples of the monomers from which $R^2_2SiO$ units are derived include the following.
$ClMe_2SiO(Me_2SiO)_nSiMe_2Cl$,
$ClMe_2SiO(Me_2SiO)_m(PhMeSiO)_nSiMe_2Cl$,
$ClMe_2SiO(Me_2SiO)_m(Ph_2SiO)_nSiMe_2Cl$,
$HOMe_2SiO(Me_2SiO)_nSiMe_2OH$,
$HOMe_2SiO(Me_2SiO)_m(PhMeSiO)_nSiMe_2OH$,
$HOMe_2SiO(Me_2SiO)_m(Ph_2SiO)_nSiMe_2OH$,
$MeOMe_2SiO(Me_2SiO)_nSiMe_2OMe$,
$MeOMe_2SiO(Me_2SiO)_m(PhMeSiO)_nSiMe_2OMe$,
$MeOMe_2SiO(Me_2SiO)_m(Ph_2SiO)_nSiMe_2OMe$ Note that m is an integer of 5 to 150 and n is an integer of 10 to 300.

$R^3_aR^4_bSiO_{(4-a-b)/2}$ unit represents an arbitrary combination of one or more siloxane units selected from among $R^3R^4SiO$, $R^3_2R^4SiO_{0.5}$, $R^4_2SiO$, and $R^3R^4_2SiO_{0.5}$ units. Examples of the monomers from which they are derived include $Me_2ViSiCl$, $MeViSiCl_2$, $Ph_2ViSiCl$, $PhViSiCl_2$, and alkoxysilanes (e.g., methoxysilanes) corresponding to the foregoing chlorosilanes.

It is acceptable for component (A) that in the $R^1SiO_{1.5}$ units, $R^2_2SiO$ units, and/or $R^3_aR^4_bSiO_{(4-a-b)/2}$ units, silanol radicals by-produced during co-hydrolysis and condensation reaction be included in an amount of up to about 10 mol % (0 to 10 mol %), preferably up to about 5 mol % (0 to 5 mol %) based on the entire siloxane units. Exemplary of silanol-containing siloxane units corresponding to the respective siloxane units are $R_1(HO)SiO$ units, $R^1(HO)_2SiO_{0.5}$ units, $R^2_2(HO)SiO_{0.5}$ units, $R^3_aR^4_b(HO)SiO_{(3-a-b)/2}$ units, and $R^3_aR^4_b(HO)_2SiO_{(2-a-b)/2}$ units.

(B) Organohydrogenpolysiloxane of Resin Structure

The organohydrogenpolysiloxane of resin structure, which is also a critical component of the inventive composition, consists of $R^1SiO_{1.5}$ units, $R^2_2SiO$ units, and $R^3_cH_dSiO_{(4-c-d)/2}$ units, wherein $R^1$, $R^2$, and $R^3$ are as defined above, c is 0, 1 or 2, d is 1 or 2, the sum c+d is 2 or 3. The number of recurring $R^2_2SiO$ units being 10 to 300, preferably 15 to 200, more preferably 20 to 100. As used herein, the term "resin structure" refers to a three-dimensional network structure. As used herein, the phrase that "the number of recurring $R^2_2SiO$ units is 10 to 300" means that at least 50 mol % (50 to 100 mol %), especially at least 80 mol % (80 to 100 mol %) of the entire $R^2_2SiO$ units included in component (B) form in the molecule a linear diorganopolysiloxane chain of the structure:

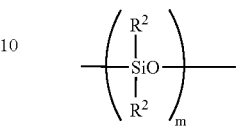

wherein m is an integer of 10 to 300.

The functions of $R^1SiO_{1.5}$, $R^2_2SiO$, and $R^3_cH_dSiO_{(4-c-d)/2}$ units are as described above.

From the standpoint of cured properties, the $R^1SiO_{1.5}$ units, $R^2_2SiO$ units, and $R^3_cH_dSiO_{(4-c-d)/2}$ units of which the organohydrogenpolysiloxane (B) is composed are preferably included in a molar ratio of 90-24:75-9:50-1, more preferably 70-28:70-20:10-2.

It is preferred from the standpoints of working and curing properties that the organohydrogenpolysiloxane (B) have a weight average molecular weight (Mw) of 3,000 to 1,000,000, more preferably 10,000 to 100,000, as determined by GPC versus polystyrene standards.

The organohydrogenpolysiloxane of resin structure can be synthesized by combining compounds corresponding to the respective units so as to give a molar ratio within the above-defined range, and effecting co-hydrolysis.

Examples of the monomers from which $R^1SiO_{1.5}$ units are derived include $MeSiCl_3$, $EtSiCl_3$, $PhSiCl_3$, propyltrichlorosilane, and cyclohexyltrichlorosilane, and alkoxysilanes (e.g., methoxysilanes) corresponding to the foregoing chlorosilanes.

Examples of the monomers from which $R^2_2SiO$ units are derived include the following.
$ClMe_2SiO(Me_2SiO)_nSiMe_2Cl$,
$ClMe_2SiO(Me_2SiO)_m(PhMeSiO)_nSiMe_2Cl$,
$ClMe_2SiO(Me_2SiO)_m(Ph_2SiO)_nSiMe_2Cl$,
$HOMe_2SiO(Me_2SiO)_nSiMe_2OH$,
$HOMe_2SiO(Me_2SiO)_m(PhMeSiO)_nSiMe_2OH$,
$HOMe_2SiO(Me_2SiO)_m(Ph_2SiO)_nSiMe_2OH$,
$MeOMe_2SiO(Me_2SiO)_nSiMe_2OMe$,
$MeOMe_2SiO(Me_2SiO)_m(PhMeSiO)_nSiMe_2OMe$,
$MeOMe_2SiO(Me_2SiO)_m(Ph_2SiO)_nSiMe_2OMe$ Note that m is an integer of 5 to 150 and n is an integer of 10 to 300.

$R^3_cH_dSiO_{(4-c-d)/2}$ unit represents an arbitrary combination of one or more siloxane units selected from among $R^3HSiO$, $R^3_2HSiO_{0.5}$, $H_2SiO$, and $R^3H_2SiO_{0.5}$ units. Examples of the monomers from which they are derived include $Me_2HSiCl$, $MeHSiCl_2$, $Ph_2HSiCl$, $PhHSiCl_2$, and alkoxysilanes (e.g., methoxysilanes) corresponding to the foregoing chlorosilanes. Exemplary of silanol-containing siloxane units corresponding to the foregoing respective siloxane units are $R^1(HO)SiO$ units, $R^1(HO)_2SiO_{0.5}$ units, $R^2_2(HO)SiO_{0.5}$ units, $R^3_cH_d(HO)SiO_{(3-c-d)/2}$ units, and $R^3_cH_d(HO)_2SiO_{(2-c-d)/2}$ units.

The organohydrogenpolysiloxane (B) is compounded in such an amount that a molar ratio of silicon-bonded hydrogen atoms (SiH radicals) in component (B) to the total of vinyl and allyl radicals in component (A) is from 0.1 to 4.0, preferably from 0.5 to 3.0, and more preferably from 0.8 to 2.0. At a molar ratio less than 0.1, curing reaction does not take place, and it is thus difficult to obtain cured silicone. At a molar ratio more than 4.0, more unreacted SiH radicals are left in the cured product which tends to change physical properties with time.

It is also acceptable for component (B) that in the $R^1SiO_{1.5}$ units, $R^2{}_2SiO$ units, and/or $R^3{}_cH_dSiO_{(4-c-d)/2}$ units, silanol radicals by-produced during co-hydrolysis and condensation reaction be included in an amount of up to about 10 mol % (0 to 10 mol %), preferably up to about 5 mol % (0 to 5 mol %) based on the entire siloxane units.

(C) Platinum Group Metal Catalyst

The catalyst (C) is effective for addition curing reaction to occur in the inventive composition. Platinum, palladium and rhodium catalysts are useful. Exemplary catalysts which are preferred from the economic aspect include platinum catalysts such as platinum, platinum black and chloroplatinic acid, and specifically, $H_2PtCl_6 \cdot mH_2O$, $K_2PtCl_6$, $KHPtCl_6 \cdot mH_2O$, $K_2PtCl_4$, $K_2PtCl_4 \cdot mH_2O$, $PtO_2 \cdot mH_2O$, $40PtCl_{440} \cdot mH_{240}O$, $PtCl_{240}$, and $H_{240}PtCl_{440} \cdot mH_2O$ wherein m is a positive integer, and complexes thereof with hydrocarbons (e.g., olefins), alcohols or vinyl-containing organopolysiloxanes. These catalysts may be used alone or in admixture.

Catalyst (C) is used in effective or catalytic amounts to promote curing, preferably in such amounts as to give 0.1 to 500 ppm, more preferably 0.5 to 100 ppm of platinum group metal based on the weight of components (A) and (B) combined.

Additives

In addition to components (A) to (C), the inventive composition may further contain per se known various additives, if necessary. Suitable additives include reinforcing inorganic fillers such as fumed silica and fumed titanium dioxide, and non-reinforcing inorganic fillers such as calcium carbonate, calcium silicate, titanium dioxide, ferric oxide, carbon black and zinc oxide. These additives may be added in suitable amounts of up to 600 parts by weight (0 to 600 parts by weight) per 100 parts by weight of components (A) and (B) combined.

In the inventive composition, adhesive aids may be added, if necessary, for improving the adhesion of the cured composition. Suitable adhesive aids are linear or cyclic organosiloxane oligomers having about 4 to about 50 silicon atoms, preferably about 4 to about 20 silicon atoms and containing in a molecule at least two, preferably two or three functional radicals selected from among silicon atom-bonded hydrogen atoms (SiH radicals), silicon atom-bonded alkenyl radicals (e.g., Si—CH=CH$_2$ radicals), alkoxysilyl radicals (e.g., trimethoxysilyl), and epoxy radicals (e.g., glycidoxypropyl and 3,4-epoxycyclohexylethyl); and organoxysilyl-modified isocyanurate compounds having the general formula (1) and/or hydrolytic condensates thereof (i.e., organosiloxane-modified isocyanurate compounds).

(1)

Herein $R^6$ is an organic radical having the formula (2):

(2)

or a monovalent hydrocarbon radical containing an aliphatic unsaturated bond, at least one of $R^6$ is an organic radical of formula (2), $R^7$ is hydrogen or a monovalent hydrocarbon radical of 1 to 6 carbon atoms, and s is an integer of 1 to 6, especially 1 to 4.

Examples of the monovalent hydrocarbon radical containing an aliphatic unsaturated bond, represented by $R^6$, include alkenyl radicals of 2 to 8 carbon atoms, especially 2 to 6 carbon atoms, such as vinyl, allyl, propenyl, isopropenyl, butenyl, isobutenyl, pentenyl, hexenyl, and cyclohexenyl. The monovalent hydrocarbon radicals represented by $R^7$ include those of 1 to 8 carbon atoms, preferably 1 to 6 carbon atoms, for example, alkyl radicals such as methyl, ethyl, propyl, isopropyl, butyl, isobutyl, tert-butyl, pentyl, hexyl and cyclohexyl, alkenyl radicals such as vinyl, allyl, propenyl and isopropenyl as exemplified above for $R^6$, and aryl radicals such as phenyl. Of these, alkyl radicals are preferred.

Illustrative examples of the adhesive aid are given below.

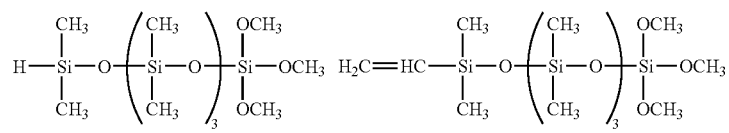

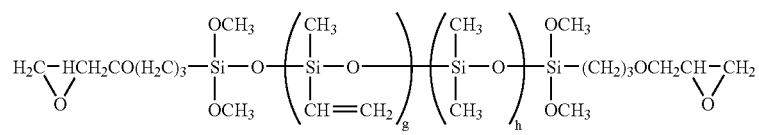

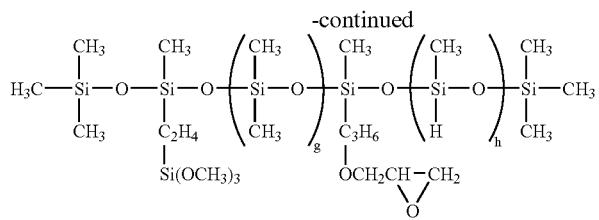
(Subscripts g and h are positive integers satisfying g+h=2 to 50, preferably 4 to 20.)
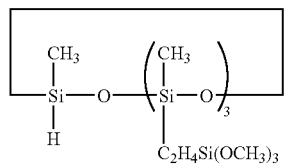
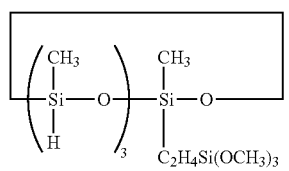
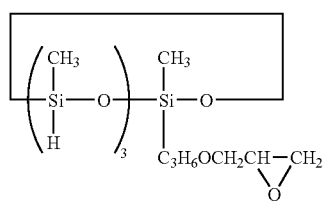
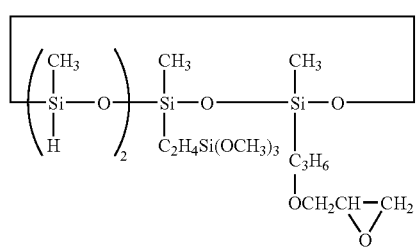
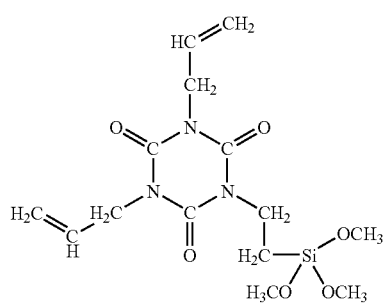
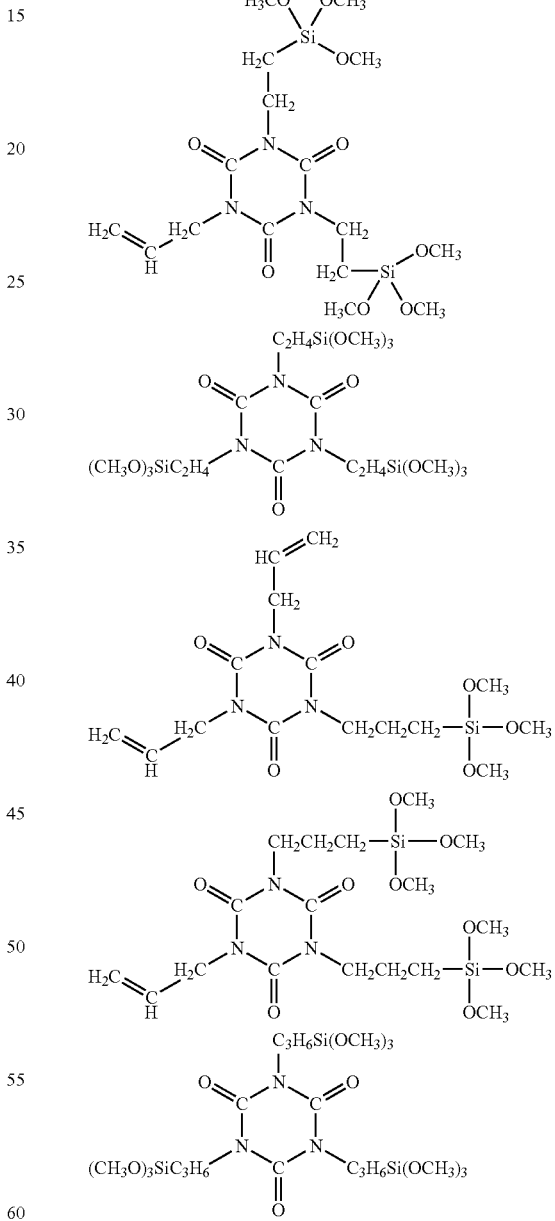
Of the foregoing organosilicon compounds, those organosilicon compounds having silicon atom-bonded alkoxy radicals and alkenyl radicals or silicon atom-bonded hydrogen atoms (i.e., SiH radicals) in a molecule are preferred because the cured compositions are more adhesive.

The adhesive aid, when used, is included in an amount of up to about 10 parts by weight (0 to 10 parts), preferably about 0.1 to 8 parts by weight, more preferably about 0.2 to 5 parts by weight, per 100 parts by weight of component (A). Too less amounts of the adhesive aid may fail to achieve the desired effect whereas too much amounts may adversely affect the hardness and surface tack of a cured composition.

The silicone composition of the invention is prepared by intimately mixing the above-described components. Most often, the composition is shelf stored in two divided form so as to prohibit the progress of cure. On use, two parts are mixed together whereupon cure takes place. It is, of course, possible to formulate a one-part composition by adding minor amounts of reaction inhibitors such as acetylene alcohol compounds.

The inventive composition quickly cures, if necessary, by heating, to form a flexible cured product having a high hardness and no surface tack. Thus the composition is useful in various applications where the tackiness of silicone should be avoided, for example, as protective coatings on electric and electronic parts, typically surface coatings on silicone rubber keyboards, and potting compounds, casting compounds, and molding compounds.

The curing conditions are not particularly limited. Usually the composition is cured by heating at about 50 to 200° C., preferably about 70 to 180° C. for about 1 to 30 minutes, preferably about 2 to 10 minutes. This may be followed by post-curing at 50 to 200° C., preferably about 70 to 180° C. for about 0.1 to 10 hours, preferably 1 to 4 hours.

Since the inventive composition is solid or semi-solid at room temperature (e.g., 25° C.), it is easy to handle and applicable to conventional molding processes. If a solvent is added, the composition becomes useful as a coating or potting compound.

EXAMPLE

Examples of the invention are given below by way of illustration and not by way of limitation. The viscosity is a measurement at 25° C. The weight average molecular weight (Mw) is determined by gel permeation chromatography (GPC) versus polystyrene standards.

Synthesis Example 1

A vinyl-containing resin was synthesized by dissolving organosilanes:27 mol of $PhSiCl_3$, 1 mol of $ClMe_2SiO(Me_2SiO)_{33}SiMe_2Cl$, and 3 mol of $MeViSiCl_2$ in toluene solvent, and adding dropwise the solution to water, whereupon cohydrolysis took place. This was followed by water washing, alkaline washing for neutralization, dewatering, and stripping off the solvent. The resin had a Mw of 62,000 and a melting point of 60° C.

Synthesis Example 2

A hydrosilyl-containing resin was synthesized by dissolving organosilanes:27 mol of $PhSiCl_3$, 1 mol of $ClMe_2SiO(Me_2SiO)_{33}SiMe_2Cl$, and 3 mol of $MeHSiCl_2$ in toluene solvent, and adding dropwise the solution to water, whereupon cohydrolysis took place. This was followed by water washing, alkaline washing for neutralization, dewatering, and stripping off the solvent. The resin had a Mw of 58,000 and a melting point of 58° C.

Synthesis Example 3

A vinyl-containing resin was synthesized by dissolving organosilanes:27 mol of $PhSiCl_3$, 1 mol of $ClMe_2SiO(Me_2SiO)_{33}SiMe_2Cl$, and 3 mol of $Me_2ViSiCl$ in toluene solvent, and adding dropwise the solution to water, whereupon cohydrolysis took place. This was followed by water washing, alkaline washing for neutralization, dewatering, and stripping off the solvent. The resin had a Mw of 63,000 and a melting point of 63° C.

Synthesis Example 4

A hydrosilyl-containing resin was synthesized by dissolving organosilanes:27 mol of $PhSiCl_3$, 1 mol of $ClMe_2SiO(Me_2SiO)_{33}SiMe_2Cl$, and 3 mol of $Me_2HSiCl$ in toluene solvent, and adding dropwise the solution to water, whereupon cohydrolysis took place. This was followed by water washing, alkaline washing for neutralization, dewatering, and stripping off the solvent. The resin had a Mw of 57,000 and a melting point of 56° C.

Example 1

A silicone resin composition was prepared by combining 189 g of the vinyl-containing resin of Synthesis Example 1 and 189 g of the hydrosilyl-containing resin of Synthesis Example 2, adding thereto 0.2 g of an acetylene alcohol, i.e., ethynyl cyclohexanol as a reaction inhibitor and 0.1 g of an octyl alcohol-modified chloroplatinic acid solution, and intimately agitating in a planetary mixer at 60° C.

This composition was compression molded on a compression molding machine and heat molded at 150° C. for 5 minutes to form a cured part. The cured part was subjected to secondary curing at 150° C. for 1 hour. The sample thus obtained was measured for tensile strength (gage 0.2 mm), hardness (by type D spring tester), and elongation (gage 0.2 mm) according to JIS K-6251 and JIS K-6253. The surface tack of the sample was tested by finger touch. The surface tack was also examined by placing the sample in commercial silver powder (average particle size 5 μm), taking out, and blowing air to the surface to see whether dust deposits (i.e., silver particles) were blown off the surface. Separately, the composition was cast into an aluminum dish having a diameter of 6 cm and a depth of 0.6 mm and cured therein to form a sample, which was subjected to a thermal cycling test between −50° C. and 150° C. whereupon cracks were inspected. The results are shown in Table 1.

Example 2

A silicone resin composition was prepared by combining 189 g of the vinyl-containing resin of Synthesis Example 3 and 189 g of the hydrosilyl-containing resin of Synthesis Example 4, adding thereto 0.2 g of an acetylene alcohol, i.e., ethynyl cyclohexanol as a reaction inhibitor and 0.1 g of an octyl alcohol-modified chloroplatinic acid solution, and intimately agitating in a planetary mixer at 60° C.

As in Example 1, the composition was molded, cured, and secondarily cured into samples, which were similarly examined for mechanical properties (tensile strength, hardness, elongation), surface tack and thermal cycling. The results are shown in Table 1.

Comparative Example 1

A composition was prepared as in Example 1 aside from using a commercially available, addition reaction cure type silicone varnish KJR-632 (Shin-Etsu Chemical Co., Ltd.) which is based on a vinyl-containing organopolysiloxane resin free of a linear diorganopolysiloxane chain structure with a number of recurring units ranging from 10 to 300. As in Example 1, the composition was molded, cured, and secondarily cured into samples, which were similarly examined for mechanical properties (tensile strength, hardness, elongation), surface tack and thermal cycling. The results are shown in Table 1.

Comparative Example 2

A composition was prepared as in Example 1 aside from using a commercially available, addition reaction cure type silicone varnish KJR-632L-1 (Shin-Etsu Chemical Co.,Ltd.) which is based on a vinyl-containing organopolysiloxane resin free of a linear diorganopolysiloxane chain structure with a number of recurring units ranging from 10 to 300. As in Example 1, the composition was molded, cured, and secondarily cured into samples, which were similarly examined for mechanical properties (tensile strength, hardness, elongation), surface tack and thermal cycling. The results are shown in Table 1.

TABLE 1

|  | Example |  | Comparative Example |  |
| --- | --- | --- | --- | --- |
|  | 1 | 2 | 1 | 2 |
| SiH/SiVi | 1.5 | 1.5 | 1.5 | 1.5 |
| Secondary curing conditions | 150° C./1 hr | 150° C./1 hr | 150° C./1 hr | 150° C./1 hr |
| Hardness (Type D) | 50 | 52 | 70 | 52 |
| Elongation (%) | 20 | 20 | 0 | 0 |
| Tensile strength (MPa) | 9 | 9 | 2 | 2 |
| Dust deposition due to surface tack | nil | nil | nil | nil |
| Thermal cycling test, 100 cycles @-50° C./150° C. | no crack | no crack | cracked | cracked |

Japanese Patent Application No. 2005-352145 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone composition comprising
   (A) an organopolysiloxane of resin structure consisting of $R^1SiO_{1.5}$ units, $R^2{}_2SiO$ units, and $R^3{}_aR^4{}_bSiO_{(4-a-b)/2}$ units, wherein $R^1$, $R^2$, and $R^3$ each are a methyl, ethyl, propyl, cyclohexyl or phenyl radical, $R^4$ is a vinyl or allyl radical, a is 0, 1 or 2, b is 1 or 2, the sum a+b is 2 or 3, the number of recurring $R^2{}_2SiO$ units being 10 to 300,
   (B) an organohydrogenpolysiloxane of resin structure consisting of $R^1SiO_{1.5}$ units, $R^2{}_2SiO$ units, and $R^3{}_cH_dSiO_{(4-c-d)/2}$ units, wherein $R^1$, $R^2$, and $R^3$ are as defined above, c is 0, 1 or 2, d is 1 or 2, the sum c+d is 2 or 3, the number of recurring $R^2{}_2SiO$ units being 10 to 300, in such an amount that a molar ratio of silicon-bonded hydrogen atoms in component (B) to vinyl or allyl radicals in component (A) is from 0.1 to 4.0, and
   (C) an effective amount of a platinum group catalyst.

2. The silicone composition of claim 1, which is solid at room temperature.

3. The silicone composition of claim 1, wherein component (A) and/or (B) contains silanol radicals.

4. A cured product obtained by curing the silicone composition of claim 1.

* * * * *